US012523168B2

(12) United States Patent
Hamamoto et al.

(10) Patent No.: US 12,523,168 B2
(45) Date of Patent: Jan. 13, 2026

(54) WORKING MACHINE, DEGRADATION DETECTION DEVICE FOR OXIDATION CATALYST, DEGRADATION DETECTION METHOD FOR OXIDATION CATALYST, AND DEGRADATION DETECTION PROGRAM FOR OXIDATION CATALYST (71) Applicant: KOBELCO CONSTRUCTION MACHINERY CO., LTD., Hiroshima (JP)

(72) Inventors: Ryo Hamamoto, Hiroshima (JP); Kazuomi Endo, Hiroshima (JP); Tomohiro Nakagawa, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 0 days.

(21) Appl. No.: 18/842,122

(22) PCT Filed: Feb. 28, 2023

(86) PCT No.: PCT/JP2023/007390
§ 371 (c)(1),
(2) Date: Aug. 28, 2024

(87) PCT Pub. No.: WO2023/167202
PCT Pub. Date: Sep. 7, 2023

(65) Prior Publication Data
US 2025/0179775 A1    Jun. 5, 2025

(30) Foreign Application Priority Data
Mar. 4, 2022    (JP) ................. 2022-033082

(51) Int. Cl.
*F01N 3/023* (2006.01)
*F01N 3/10* (2006.01)
*F01N 11/00* (2006.01)

(52) U.S. Cl.
CPC ............. *F01N 3/023* (2013.01); *F01N 3/103* (2013.01); *F01N 11/002* (2013.01);
(Continued)

(58) Field of Classification Search
CPC ........ F01N 3/023; F01N 3/103; F01N 11/002; F01N 2900/0418; F01N 2900/1404; F01N 2900/1602
See application file for complete search history.

(56) References Cited

U.S. PATENT DOCUMENTS

| 12,312,268 | B2 * | 5/2025 | Wang | ....................... B09C 1/105 |
| 2004/0260452 | A1 * | 12/2004 | Hamahata | ............. F01N 13/009 701/108 |

(Continued)

FOREIGN PATENT DOCUMENTS

| JP | 2004-353606 A | 12/2004 |
| JP | 2010-31697 A | 2/2010 |

(Continued)

OTHER PUBLICATIONS

Extended European Search Report issued Feb. 27, 2025 in European Patent Application No. 23763459.7, 10 pages.

(Continued)

*Primary Examiner* — Matthew T Largi
(74) *Attorney, Agent, or Firm* — Oblon, McClelland, Maier & Neustadt, L.L.P.

(57) ABSTRACT

A working machine, an oxidation catalyst degradation detection device, an oxidation catalyst degradation detection method, and an oxidation catalyst degradation detection program are provided, which enable a suitable detection of (Continued)

a degradation of an oxidation catalyst. A working machine includes a temperature detecting device for detecting a temperature between an oxidation catalyst and a filter, and a controller. The controller calculates an average of temperatures detected by the temperature detecting device in a regeneration processing of the filter, and calculates a degradation degree of the oxidation catalyst on the basis of the calculated average.

10 Claims, 3 Drawing Sheets

(52) U.S. Cl.
CPC ............... *F01N 2900/0418* (2013.01); *F01N 2900/1404* (2013.01); *F01N 2900/1602* (2013.01)

(56) References Cited

U.S. PATENT DOCUMENTS

| | | | |
|---|---|---|---|
| 2005/0279156 A1 | 12/2005 | He et al. | |
| 2008/0162026 A1* | 7/2008 | Groer | G07C 5/085 |
| | | | 701/115 |
| 2011/0023467 A1* | 2/2011 | Kong | F02D 41/1497 |
| | | | 60/287 |
| 2011/0126517 A1 | 6/2011 | Miyoshi et al. | |
| 2012/0060478 A1* | 3/2012 | Vernassa | F02D 41/1445 |
| | | | 73/23.31 |
| 2013/0228008 A1* | 9/2013 | Tsunekawa | F01N 3/0814 |
| | | | 73/114.75 |
| 2014/0223886 A1* | 8/2014 | Khaled | F01N 3/106 |
| | | | 60/277 |
| 2016/0237873 A1 | 8/2016 | Fujie et al. | |
| 2016/0273436 A1* | 9/2016 | Imai | F01N 3/021 |
| 2018/0268624 A1* | 9/2018 | Remboski | B60W 50/0097 |
| 2021/0040875 A1* | 2/2021 | Mizukami | B60Q 9/00 |
| 2021/0183183 A1* | 6/2021 | Borregard | F01N 3/208 |
| 2023/0235692 A1* | 7/2023 | Engbom | F01N 11/00 |
| | | | 701/114 |

FOREIGN PATENT DOCUMENTS

| | | |
|---|---|---|
| JP | 2012-36856 A | 2/2012 |
| JP | 2013-124631 A | 6/2013 |
| JP | 2015-71991 A | 4/2015 |
| JP | 2015-148182 A | 8/2015 |
| JP | 2015-223583 A | 12/2015 |
| JP | 2016-6311 A | 1/2016 |
| WO | WO 2010/133276 A1 | 11/2010 |

OTHER PUBLICATIONS

International Search Report mailed on May 9, 2023 in PCT/JP2023/007390 filed on Feb. 28, 2023 (3 pages).

\* cited by examiner

WORKING MACHINE, DEGRADATION DETECTION DEVICE FOR OXIDATION CATALYST, DEGRADATION DETECTION METHOD FOR OXIDATION CATALYST, AND DEGRADATION DETECTION PROGRAM FOR OXIDATION CATALYST

TECHNICAL FIELD

The present invention relates to a working machine, an oxidation catalyst degradation detection device, an oxidation catalyst degradation detection method, and an oxidation catalyst degradation detection program for detecting a degradation of an oxidation catalyst used in an exhaust gas aftertreatment apparatus provided in a vehicle.

BACKGROUND ART

Patent Literature 1 discloses that a degradation degree of an oxidation catalyst used in an exhaust gas purifier can be seen based on a temperature increase rate of the oxidation catalyst.

Further, Patent Literature 2 discloses that a chronological variation in CO or HC oxidation rate and NO oxidation rate of an exhaust gas oxidation catalyst is measured to judge a sulfur poisoning degradation of the exhaust gas oxidation catalyst when the chronological variation in the CO or HC oxidation rate and the NO oxidation rate involves a decrease from the initial oxidation rate.

However, in Patent Literature 1, it is necessary to calculate the temperature increase rate of the oxidation catalyst under a stable environment. Additionally, in a case that the temperature increase rate variation is small, there is a likelihood that a calculation cannot be established by a device incorporated in a vehicle without calculation of a multiple because the number of significant digits is too small to calculate a degradation degree. Further, in Patent Literature 2, it is necessary to provide a sensor for CO/HC/NO, which increases the cost.

CITATION LIST

Patent Literature

Patent Literature 1: Japanese Unexamined Patent Publication No. 2016-6311
Patent Literature 2: Japanese Unexamined Patent Publication No. 2015-223583

SUMMARY OF INVENTION

An object of the present invention is to provide a working machine, an oxidation catalyst degradation detection device, an oxidation catalyst degradation detection method, and an oxidation catalyst degradation detection program which enable a suitable detection of a degradation of an oxidation catalyst.

It provides a working machine including an exhaust gas aftertreatment apparatus having a filter for collecting a particle from exhaust gas of an engine and an oxidation catalyst provided upstream of the filter for oxidizing unburnt fuel, the working machine being configured to detect degradation of the oxidation catalyst and including: a temperature detecting device for detecting a temperature between the oxidation catalyst and the filter; and a controller, wherein the controller executes a regeneration processing of heating the filter to burn the particle accumulated on the filter, calculates an average of temperatures detected by the temperature detecting device in the regeneration processing, and calculates a degradation degree of the oxidation catalyst on the basis of the average.

Further, it provides an oxidation catalyst degradation detection device for an exhaust gas aftertreatment apparatus having a filter for collecting a particle from exhaust gas of an engine and an oxidation catalyst provided upstream of the filter for oxidizing unburnt fuel, the oxidation catalyst degradation detection device which detects degradation of the oxidation catalyst and includes: a temperature detecting device for detecting a temperature between the oxidation catalyst and the filter; and a controller, wherein the controller executes a regeneration processing of heating the filter to burn the particle accumulated on the filter; calculates an average of temperatures detected by the temperature detecting device in the regeneration processing; and calculates a degradation degree of the oxidation catalyst on the basis of the average.

Further, it provides an oxidation catalyst degradation detection method for an exhaust gas aftertreatment apparatus having a filter for collecting a particle from exhaust gas of an engine and an oxidation catalyst provided upstream of the filter for oxidizing unburnt fuel, the oxidation catalyst degradation detection method that detects degradation of the oxidation catalyst and includes: a regeneration processing step of executing a regeneration processing of heating the filter to burn the particle accumulated on the filter; a temperature detection step of detecting a temperature between the oxidation catalyst and the filter; an average calculation step of calculating an average of temperatures detected in the temperature detection step in the regeneration processing; and a degradation degree calculation step of calculating a degradation degree of the oxidation catalyst on the basis of the average calculated in the average calculation step.

Further, it provides an oxidation catalyst degradation detection program for an exhaust gas aftertreatment apparatus having a filter for collecting a particle from exhaust gas of an engine and an oxidation catalyst provided upstream of the filter for oxidizing unburnt fuel, the oxidation catalyst degradation detection program causing a computer to detect degradation of the oxidation catalyst by causing the computer to execute: a regeneration processing step of performing a regeneration processing of heating the filter to burn the particle accumulated on the filter; a temperature detection step of detecting a temperature between the oxidation catalyst and the filter; an average calculation step of calculating an average of temperatures detected in the temperature detection step in the regeneration processing; and a degradation degree calculation step of calculating a degradation degree of the oxidation catalyst on the basis of the average calculated in the average calculation step.

According to the present invention, a degradation degree of an oxidation catalyst is calculated on the basis of an averaged temperature between the oxidation catalyst and a filter in a regeneration processing of the filter. A temperature increase rate of an oxidation catalyst is small even when the oxidation catalyst is degraded. In the case that the degradation degree of the oxidation catalyst is calculated on the basis of the temperature increase rate as in Patent Literature 1, there is the need to increase the number of significant digits (resolution) of the temperature increase rate. In contrast, the averaged temperature varies more notably than the temperature increase rate when the oxidation catalyst is degraded. Therefore, the calculation of the degradation degree of the oxidation catalyst based on the averaged temperature decreases the number of significant digits (resolution) of the averaged temperature. This enables even an inexpensive device having a small resolution to calculate a degradation degree of an oxidation catalyst, and thus ensures a suitable detection of a degradation of an oxidation catalyst.

DESCRIPTION OF EMBODIMENTS

Figure 1:
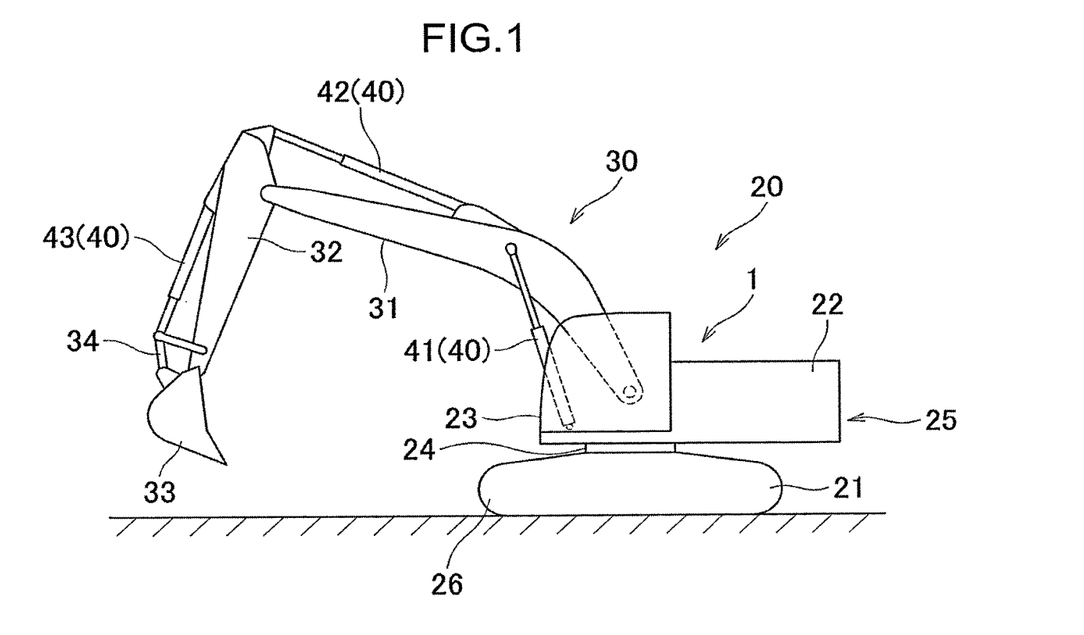
FIG. 1 is a side view of a working machine.

Hereinafter, a preferred embodiment of the present invention will be described with reference to the drawings.
Configuration of Working Machine A working machine 20 according to an embodiment of the present invention includes an oxidation catalyst degradation detection device (degradation detection device 1) as shown in FIG. 1, which is a side view of the working machine 20. The degradation detection device 1 is configured to detect a degradation of an oxidation catalyst used in an exhaust gas aftertreatment: apparatus provided in a vehicle. The working machine 20 includes the vehicle. For example, the working machine 20 shown in FIG. 1 is a hydraulic excavator.

The working machine 20 includes: a machine body 25 having a lower travelling body 21 and an upper slewing body 22; an attachment 30; and a cylinder 40. The vehicle of the working machine 20 has the lower travelling body 21, the upper slewing body 22, the attachment 30, and the cylinder 40.

The lower travelling body 21 is a part which causes the working machine 20 to travel, and is provided with, for example, left and right crawlers 26. The upper slewing body 22 is mounted on the lower travelling body 21 in such a manner as to be slewable via a slewing device 24. The upper slewing body 22 has a front portion provided with a cab (driving room) 23.

The attachment 30 is attached to the upper slewing body 22 in such a manner as to swing in an up-down direction. The attachment 30 has a boom 31, an arm 32, and a bucket 33. The boom 31 is attached to the upper slewing body 22 in such a manner as to swing (tilt) in the up-down direction. The arm 32 is attached to the boom 31 in such a manner as to swing in the up-down direction. The bucket 33 is attached to the arm 32 in such a manner as to swing in a front-rear direction. The bucket 33 is a leading end attachment constituting a leading end of the attachment 30, and performs a work, such as excavating, levelling, and scooping earth and sand. A working target to be held by the bucket 33 is not limited to the earth and sand, but may include a stone, or waste (e.g., industrial waste). Further, the leading end attachment is not limited to the bucket 33, but may include a grapple or a lifting magnet.

The cylinder 40 is capable of swinging the attachment 30 by a hydraulic pressure. The cylinder 40 is a hydraulic cylinder which is extendable and contractable. The cylinder 40 has a boom cylinder 41, an arm cylinder 42, and a bucket cylinder 43.

The boom cylinder 41 causes the boom 31 to swing on the upper slewing body 22. The boom cylinder 41 has a proximal end pivotably attached to the upper slewing body 22. The boom cylinder 41 has a distal end pivotably attached to the boom 31.

The arm cylinder 42 causes the arm 32 to swing on the boom 31. The arm cylinder 42 has a proximal end pivotably attached to the boom 31. The arm cylinder 42 has a distal end pivotably attached to the arm 32.

Figure 2:
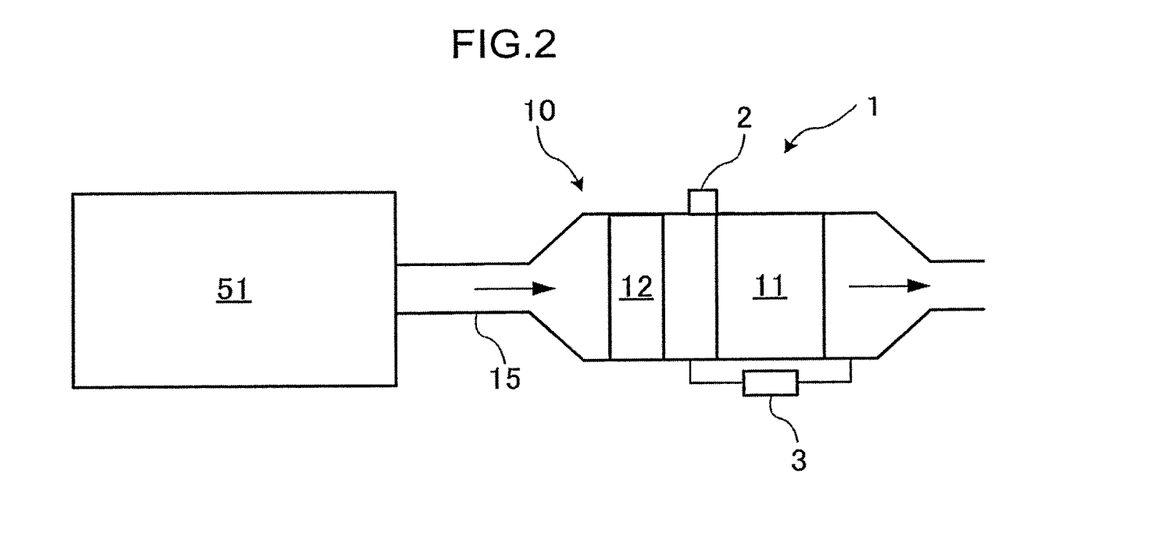
FIG. 2 is a diagram showing a structure of an exhaust gas aftertreatment apparatus.

The bucket cylinder 43 causes the bucket 33 to swing on the arm 32. The bucket cylinder 43 has a proximal end pivotably attached to the arm 32. The bucket cylinder 43 has a distal end pivotably attached to a link member 34 which is pivotably attached to the bucket 33.
Configuration of Exhaust Gas Aftertreatment Apparatus As shown in FIG. 2, which is a diagram showing a structure of an exhaust gas aftertreatment apparatus 10, the working machine 20 includes the exhaust gas aftertreatment apparatus 10. The exhaust gas aftertreatment apparatus 10 is provided in an exhaust pipe 15 where exhaust gas of the engine 51 passes through, and collects particles, e.g., soot, from the exhaust gas. The exhaust gas aftertreatment apparatus 10 includes a filter 11 for collecting the particles and an oxidation catalyst 12 which is provided upstream of the filter 11 and oxidizes unburnt fuel.

The degradation detection device 1 includes a temperature sensor (temperature detecting device) 2 and a differential pressure sensor 3. The temperature sensor 2 detects a temperature between the oxidation catalyst 12 and the filter 11. In other words, the temperature sensor 2 detects a temperature at a position which is upstream of the filter 11 and is downstream of the oxidation catalyst 12. In the present embodiment, the temperature sensor 2 detects a temperature at an inlet of the filter 11 as shown in FIG. 2.

The temperature sensor 2 may detect a temperature of exhaust gas flowing in a space between the oxidation catalyst 12 and the filter 11, may detect a temperature of a pipe between the oxidation catalyst 12 and the filter 11, may detect a temperature of the oxidation catalyst 12 at an outlet of the oxidation catalyst 12, or may detect a temperature of the filter 11 at the inlet of the filter 11.

Figure 3:
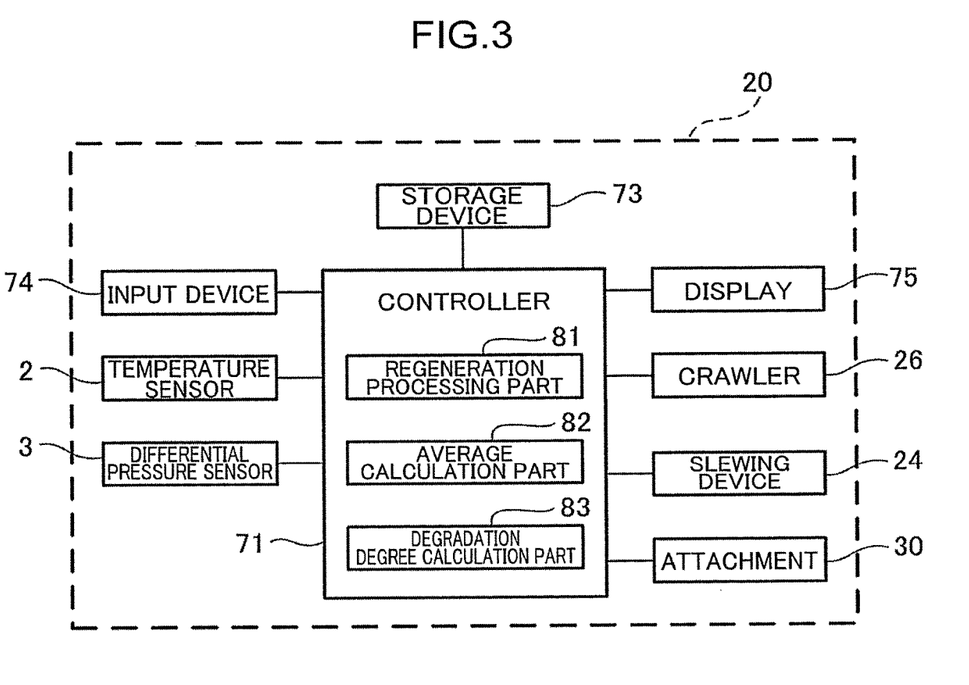
FIG. 3 is a circuit diagram of the working machine.

The differential pressure sensor 3 detects a differential pressure between the inlet and the outlet of the filter 11. In other words, the differential pressure sensor 3 detects the differential pressure which is a difference between a pressure at the inlet of the filter 11 and a pressure at the outlet of the filter 11.
Circuit Configuration of Working Machine As shown in FIG. 3, which is a circuit diagram of the working machine 20, the working machine 20 includes a controller 71, a storage device 73, an input device 74, and a display (display device) 75. The storage device 73 is an exemplary recording device. The controller 71 includes a computer.

A temperature value detected by the temperature sensor 2 is input to the controller 71. Further, a differential pressure value detected by the differential pressure sensor 3 is input to the controller 71. Further, various instructions from the input device 74 are input to the controller 71. The display 75 is provided inside the cab 23.

The controller 71 includes a regeneration processing part 81, an average calculation part 82, and a degradation degree calculation part 83.

As shown in FIG. 2, when a sulfur content in fuel in the engine 51 is high, the sulfur content adheres to the oxidation catalyst 12, which lowers a temperature at which the fuel burns. Consequently, unburnt fuel accumulates in the exhaust gas aftertreatment apparatus 10. Additionally, particles are left unburnt on the filter 11. When the particles are left unburnt, the differential pressure value detected by the differential pressure sensor 3 increases.

The regeneration processing part 81 shown in FIG. 3 determines the filter 11 to be clogged when the differential pressure value detected by the differential pressure sensor 3 is a set value or greater. In the case that the filter 11 is clogged, the regeneration processing part 81 prompts an operator (worker) to give an instruction of an execution of a regeneration processing of the filter 11. Specifically, the regeneration processing part 81 executes a processing to cause the display 75 to display a wording which prompts the regeneration processing of the filter 11. The regeneration processing is a processing of increasing a load on the engine 51 and heating the filter 11 to burn the particles accumulated on the filter 11.

The input device 74 receives an input by the operator for the working machine 20. Specifically, the input device 74 receives an input to instruct the execution of the regeneration processing.

When receiving the execution instruction of the regeneration processing from the input device 74, the regeneration processing part (regeneration processing means) 81 executes the regeneration processing. Specifically, the regeneration processing part 81 executes a processing of applying a load on an (unillustrated) pump driven by the engine 51 to increase the load on the engine 51.

When the regeneration processing is executed, the accumulated unburnt fuel and particles burn. There is a case that this involves an abnormal burning temperature rises. In this case, the filter 11 is liable to melt.

Accordingly, the average calculation part (average calculation means) 82 calculates an average of temperatures detected by the temperature sensor 2 in the regeneration processing of the filter 11. The average calculation part 82 preferably calculates an average of temperatures when the load on the engine 51 is a predetermined value or smaller.

The degradation degree calculation part (degradation degree calculation means) 83 calculates a degradation degree of the oxidation catalyst 12 on the basis of the average calculated by the average calculation part 82.

Specifically, the degradation degree calculation part 83 determines whether the regeneration processing is executed a predetermined first number of times or N1 or more in a certain first period T1 and the averaged temperature is higher than a predetermined first temperature D1 and lower than a predetermined second temperature D2. Further, the degradation degree calculation part 83 determines whether the regeneration processing is executed a predetermined second number of times or N2 or more in a certain second period T2 and the averaged temperature is lower than a predetermined third temperature D3. The second period T2 is not shorter than the first period T1, and may be longer than the first period T1. The second number of times or N2 is larger than the first number of times or N1. The third temperature D3 has a value not greater than the first temperature D1, and may have a value smaller than the first temperature D1. The second temperature D2 has a value greater than the first temperature D1.

In a case that the averaged temperature is higher than the first temperature D1 and lower than the second temperature D2 although the regeneration processing is executed the first number of times or N1 or more in the first period T1, this is judged, for example, as a drop of the burning temperature of the particles at the oxidation catalyst 12 due to a poisoning degradation of the oxidation catalyst 12 caused by sulfur contained in the fuel. In this case, the degradation degree calculation part 83 causes the display 75 to indicate the poisoning degradation of the oxidation catalyst 12. Specifically, the display (warning device) 75 issues a warning commensurate with the degradation degree of the oxidation catalyst 12 calculated by the degradation degree calculation part 83. This can prompt the operator to perform an operation (work) for a recovery of the oxidation activity of the oxidation catalyst 12.

Further, in a case that the averaged temperature is lower than the third temperature D3 although the regeneration processing is executed the second number of times or N2 or more in the second period T2, this is judged, for example, as the clogging of the filter 11 with the particles left unburnt due to the drop of the burning temperature of the particles at the oxidation catalyst 12. When the filter 11 in the clogged state undergoes the regeneration processing of the filter 11, the burning temperature may rise abnormally, and consequently, the filter 11 is liable to melt. Accordingly, in this case, the degradation degree calculation part 83 causes the display 75 to indicate the clogging of the filter 11. This can prompt the operator to replace the filter 11.

In the case that the filter 11 is judged to be clogged, the load on the engine 51 may be increased to thereby assist the regeneration processing.

Further, the warning is issued by the display 75, but may be issued by another device such as a speaker.

As described above, the degradation degree calculation part 83 calculates a degradation degree of the oxidation catalyst 12 on the basis of an averaged temperature calculated by the average calculation part 82 using temperatures detected by the temperature sensor 2 when the load on the engine 51 is the predetermined value or smaller. In other words, no degradation degree of the oxidation catalyst 12 is calculated by the degradation degree calculation part 83 on the basis of an averaged temperature calculated using temperatures detected by the temperature sensor 2 when the load on the engine 51 exceeds the predetermined value.

As described above, a degradation degree of the oxidation catalyst 12 is calculated on the basis of an average of temperatures at a position which is upstream of the filter 11 and is downstream of the oxidation catalyst 12 in the regeneration processing of the filter 11. A temperature increase rate of the oxidation catalyst 12 is small even when the oxidation catalyst 12 is degraded. In the case that the degradation degree of the oxidation catalyst 12 is calculated on the basis of the temperature increase rate as in Patent Literature 1, there is the need to increase the number of significant digits (resolution) of the temperature increase rate. In contrast, the averaged temperature varies more notably than the temperature increase rate when the oxidation catalyst 12 is degraded. Therefore, the calculation of the degradation degree of the oxidation catalyst 12 based on the averaged temperature decreases the number of significant digits (resolution) of the averaged temperature. This enables even an inexpensive device having a small resolution to calculate a degradation degree of the oxidation catalyst 12. This ensures a suitable detection of a degradation of the oxidation catalyst 12.

Further, the averaged temperature is calculated when the load on the engine 51 is the predetermined value or smaller. The calculation of the averaged temperature when the load on the engine 51 is the predetermined value or smaller can keep the temperature variation from being affected by the change in the load on the engine. Accordingly, an average with a small margin of error can be obtained.

Further, the determination is carried out as to whether the regeneration processing is executed the first number of times or N1 or more in the first period T1 and the averaged temperature is higher than the first temperature D1 and lower than the second temperature D2. In a case that the averaged temperature is higher than the first temperature D1 and lower than the second temperature D2 although the regeneration processing is executed the first number of times or N1 or more in the first period T1, this is judged, for example, as a drop of a burning temperature of the particles at the oxidation catalyst 12 due to a poisoning degradation of the oxidation catalyst 12 caused by sulfur contained in the fuel. In this case, the controller 71 can prompt the operator to perform an operation (work) for a recovery of the oxidation activity of the oxidation catalyst 12 by notifying, for example, of the poisoning degradation of the oxidation catalyst 12.

Further, the determination is carried out as to whether the regeneration processing is executed the second number of times or N2 or more that is larger than the first number of times or N1 in the second period T2 not shorter than the first period T1 and the averaged temperature is lower than the third temperature D3 not higher than the first temperature D1. In the case that the averaged temperature is lower than the third temperature D3 although the regeneration processing is executed the second number of times or N2 or more in the second period T2, this is judged, for example, as the clogging of the filter 11 with the particles left unburnt due to the drop of the burning temperature of the particles at the oxidation catalyst 12. When the filter 11 in the clogged state undergoes the regeneration processing of the filter 11, the burning temperature is likely to rise abnormally, and consequently, the filter 11 is liable to melt. Therefore, in this case, the controller 71 can prompt the operator to replace the filter 11 by notifying, for example, of the clogging of the filter 11.

Further, in this embodiment, a warning commensurate with the degradation degree of the oxidation catalyst is issued. On the basis of this warning, it is possible to prompt the operator to recover the oxidation activity of the oxidation catalyst 12 and replace the filter 11, for example.

Figure 4:
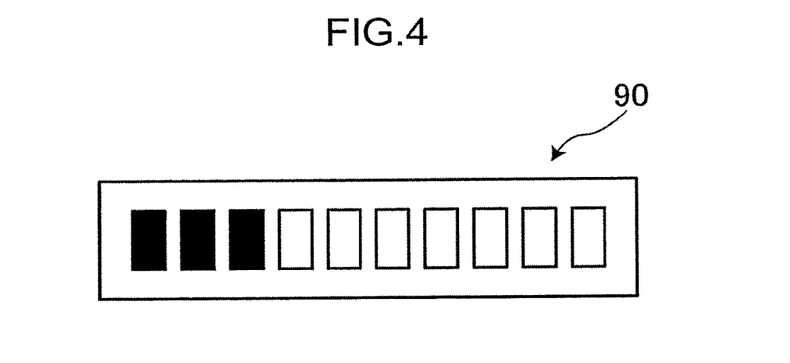
FIG. 4 is an illustration showing an indicator.

The display 75 displays the degradation degree of the oxidation catalyst 12 calculated by the degradation degree calculation part 83. Specifically, as shown in FIG. 4, which is an illustration showing an indicator 90, the indicator 90 is displayed on the display 75. This indicator 90 displays the degradation degree of the oxidation catalyst 12 on a scale of a plurality of levels (e.g., ten levels). A higher level among the levels in the indicator 90 indicates a more serious degradation of the oxidation catalyst 12. The indicator 90 can notify through the display the operator of a time to recover the oxidation activity of the oxidation catalyst 12 and replace the filter 11, for example.

The degradation degree of the oxidation catalyst 12 can be obtained according to a function including an averaged temperature as an input. The averaged temperature and the value of the indicator 90 may be approximated by a linear function. In this case, for example, an integer of a value obtained by a linear function "51−0.09×(averaged temperature)" is commensurate with any one of the levels in the indicator 90. For example, when the averaged temperature is 550° C., the level in the indicator 90 is "1"; when the averaged temperature is 500° C., the level in the indicator 90 is "6"; and when the averaged temperature is 470° C., the level in the indicator 90 is "8". For example, the indicator 90 represents the levels "1 to 4" in green, the levels "5 to 7" in yellow, and the levels "8 to 10" in red.

When the amount of the particles accumulated on the filter 11 is changed, the degradation degree calculation part 83 updates the level of the indicator 90. When the amount of the particles accumulated on the filter 11 is not changed, the degradation degree calculation part 83 maintains the previous level without changing the level in the indicator 90. Further, when the degradation degree of the oxidation catalyst 12 changes, or when the averaged temperature changes, the degradation degree calculation part 83 may update the level in the indicator 90.

The display device on which the indicator 90 is displayed is not limited to a display 75 provided on the working machine 20, but may be a smartphone carried by a site foreman who is at a work site, a monitor of a computer for a manager at the work site, or an electronic bulletin board seen by persons pertaining to the work site.

When the working machine 20 is operated in the state that the warning is issued by the display 75, the storage device 73 shown in FIG. 3 records the operation. "The working machine 20 is operated" means that at least one of the lower travelling body 21, the upper slewing body 22, and the attachment 30 is operated. "The lower travelling body 21 is operated" means that the lower travelling body 21 is caused to travel using the crawler 26. "The upper slewing body 22 is operated" means that the upper slewing body 22 is slewed by the slewing device 24. "The attachment 30 is operated" means that at least one of the boom 31, the arm 32, and the bucket 33 is operated. A record which is recorded in the storage device 73 and concerns the operations performed to the working machine 20 may be used, for example, as information to be consulted when the exhaust gas aftertreatment apparatus 10 is repaired.

When the working machine 20 is operated in the state that the warning is issued by the display 75 or the level of the indicator 90 is represented in yellow or red, the controller 71 may issue a warning from the display 75 or a speaker, or may send to a server and the like an e-mail notifying that the working machine 20 is operated.

The controller (security processing means) 71 executes an information security processing to information about the degradation degree to be sent to the display 75. Specifically, the controller 71 attaches a signature to the information to be sent to the display 75. The display 75 verifies this signature, and when the verification is successful, issues the warning. The signature attached to the information sent from the controller 71 is verified by the display 75, thus a falsification of the information can be detected, and a source can be located, which enables the prevention of an identity fraud. Consequently, the information security can be ensured.

Further, the controller 71 encrypts the information to be sent to the display 75. The encryption may use either a public key cryptosystem or a common key cryptosystem. The display 75 decrypts the encrypted information, and issues the warning when the decryption is successful. The encrypted information sent from the controller 71 is decrypted by the display 75, which enables the maintenance of a high confidentiality. Consequently, the information security can be ensured.

Modifications

In the configuration described above, the calculation of a degradation degree of the oxidation catalyst 12 is carried out by the controller 71 (degradation degree calculation part 83) of the working machine 20. However, the calculation of the degradation degree of the oxidation catalyst 12 may be carried out by an external device, e.g., a server, provided outside the working machine 20. Specifically, an averaged temperature calculated by the controller 71 (average calculation part 82) of the working machine 20 may be sent to an external device such as a server, and the external device may calculate the degradation degree of the oxidation catalyst 12 on the basis of the averaged temperature. This calculation of the degradation degree of the oxidation catalyst 12 outside the working machine 20 can reduce the load on the controller 71 mounted on the working machine 20.

Operations of Degradation Detection Device

Figure 5:
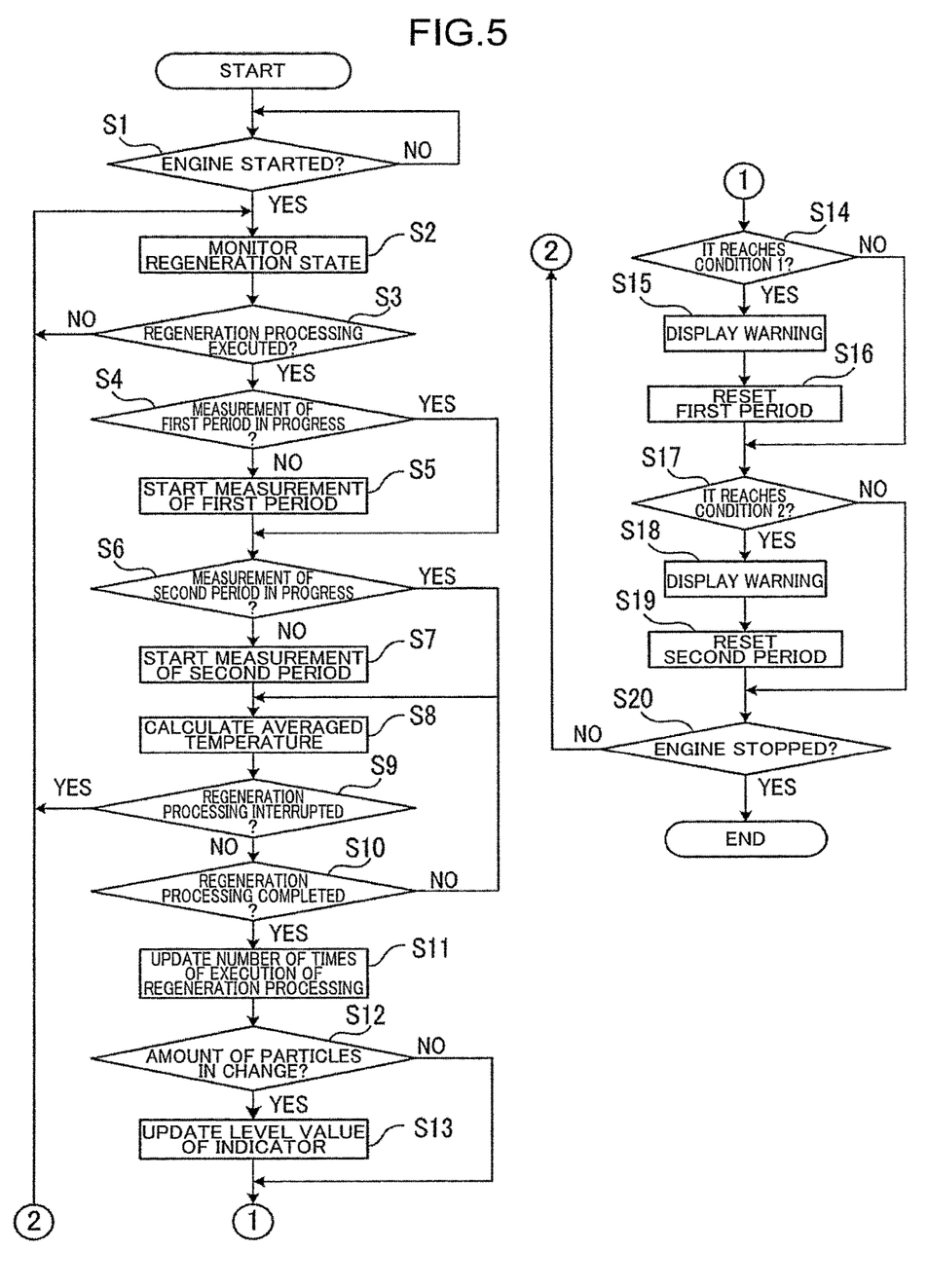
FIG. 5 is a flowchart of a degradation detection process.

Hereinafter, operations of the degradation detection device 1 will be described with reference to FIG. 5, which is a flowchart of the degradation detection process.

The operations of the degradation detection device 1 include: a regeneration processing step of executing the regeneration processing of heating the filter 11 to burn the particle accumulated on the filter 11; a temperature detection step of detecting a temperature between the oxidation catalyst 12 and the filter 11; an average calculation step of calculating an average of temperatures detected in the temperature detection step in the regeneration processing; and a degradation degree calculation step of calculating a degradation degree of the oxidation catalyst 12 on the basis of the average calculated in the average calculation step.

First, the controller 71 determines whether the engine 51 is started or not (Step S1). When determining that the engine 51 is not started in Step S1 (S1: NO), the controller 71 repeats Step S1. On the other hand, when determining that the engine 51 is started in Step S1, the controller 71 monitors a regeneration state of the filter 11 (Step S2). Specifically, it monitors how many times the regeneration processing is executed from a measurement start of the first period T1 and how many times the regeneration processing is executed from a measurement start of the second period T2.

Next, the controller 71 determines whether the regeneration processing is executed or not (Step S3). When determining that the regeneration processing is not executed in Step S3 (S3: NO), the controller 71 returns to Step S2. On the other hand, when determining that the regeneration processing is executed in Step S3 (S3: YES), the controller 71 determines whether the measurement of the first period T1 is in progress or not (Step S4). When determining that the measurement of the first period T1 is not in progress in Step S4 (S4: NO), the controller 71 starts the measurement of the first period T1 (Step S5).

When determining that the measurement of the first period T1 is in progress in Step S4 (S4: YES), or alternatively, after Step S5, the controller 71 determines whether the measurement of the second period T2 is in progress or not (Step S6). When determining that the measurement of the second period T2 is not in progress in Step S6 (S6: NO), the controller 71 starts the measurement of the second period T2 (Step S7).

When determining that the measurement of the second period T2 is in progress in Step S6 (S6: YES), or alternatively, after Step S7, the controller 71 calculates the averaged temperature (Step S8). Next, the controller 71 determines whether the regeneration processing is interrupted or not (Step S9). When determining that the regeneration processing is interrupted in Step S9 (S9: YES), the controller 71 returns to Step S2. On the other hand, when determining that the regeneration processing is not interrupted in Step S9 (S9: NO), the controller 71 determines whether the regeneration processing is completed (Step S10).

When determining that the regeneration processing is not completed in Step S10 (S10: NO), the controller 71 returns to Step S8. On the other hand, when determining that the regeneration processing is completed in Step S10 (S10: YES), the controller 71 updates the number of times of execution of the regeneration processing (Step S11).

Next, the controller 71 determines whether the amount of particles accumulated on the filter 11 is in change or not (Step S12). When determining that the amount of particles accumulated on the filter 11 is in change in Step S12 (S12: YES), the controller 71 updates the level (level value) of the indicator 90 (Step S13).

When determining that the amount of particles accumulated on the filter 11 is not in change in Step S12 (S12: NO), or alternatively, after Step S13, the controller 71 determines whether it reaches Condition 1 or not (Step S14). Condition 1 is that the regeneration processing be executed the first number of times or N1 or more in the first period T1 and the averaged temperature be higher than the first temperature D1 and lower than the second temperature D2.

When determining that it reaches Condition 1 in Step S14 (S14: YES), the controller 71 causes the display 75 to display a warning (Step S15). This warning is intended for prompting the operator to perform an operation (work) to recover the oxidation activity of the oxidation catalyst 12. Further, the controller 71 resets the first period T1 (Step S16).

When determining that it does not reach Condition 1 in Step S14 (S14: NO), or alternatively, after Step S16, the controller 71 determines whether it reaches Condition 2 (Step S17). Condition 2 is that the regeneration processing be executed the second number of times or N2 or more in the second period T2 and the averaged temperature be lower than the third temperature D3.

When determining that it reaches Condition 2 in Step S17 (S17: YES), the controller 71 causes the display 75 to display a warning (Step S18). This warning is intended for prompting the operator to replace the filter 11. Further, the controller 71 resets the second period T2 (Step S19).

Next, the controller 71 determines whether the engine 51 is stopped or not (Step S20). When determining that the engine 51 is not stopped in Step S20 (S20: NO), the controller 71 returns to Step S2. On the other hand, when determining that the engine 51 is stopped in Step S20 (S20: YES), the controller 71 ends the flow.

Effect

As described above, the degradation detection device 1 according to the present embodiment calculates a degradation degree of the oxidation catalyst 12 on the basis of an averaged temperature at a position which is upstream of the filter 11 and is downstream of the oxidation catalyst 12 in the regeneration processing of the filter 11. The temperature increase rate of the oxidation catalyst 12 is small even when the oxidation catalyst 12 is degraded. In the case that the degradation degree of the oxidation catalyst 12 is calculated on the basis of the temperature increase rate as in Patent Literature 1, there is the need to increase the number of significant digits (resolution) of the temperature increase rate. In contrast, the averaged temperature varies more notably than the temperature increase rate when the oxidation catalyst 12 is degraded. Therefore, the calculation of the degradation degree of the oxidation catalyst 12 based on the averaged temperature decreases the number of significant digits (resolution) of the averaged temperature. This enables even an inexpensive device having a small resolution to calculate the degradation degree of the oxidation catalyst 12. This ensures a suitable detection of the degradation of the oxidation catalyst.

Further, the averaged temperature is calculated when the load on the engine 51 is the predetermined value or smaller. The calculation of the averaged temperature when the load on the engine 51 is the predetermined value or smaller can keep the temperature variation from being affected by the change in the load on the engine 51. Accordingly, an average involving a smaller error can be obtained.

Further, the determination is carried out as to whether the regeneration processing is executed the first number of times or N1 or more in the first period T1 and the averaged temperature is higher than the first temperature D1 and lower than the second temperature D2. In the case that the averaged temperature is higher than the first temperature D1 and lower than the second temperature D2 although the regeneration processing is executed the first number of times or N1 or more in the first period T1, this is judged, for example, as a drop of the burning temperature of the particles at the oxidation catalyst 12 due to the poisoning degradation of the oxidation catalyst 12 caused by sulfur contained in the fuel. In this case, for example, the notification of the poisoning degradation of the oxidation catalyst 12 can prompt the operator to perform an operation (work) to recover the oxidation activity of the oxidation catalyst 12. Further, the determination is carried out as to whether the regeneration processing is executed the second number of times or N2 or more that is larger than the first number of times or N1 in the second period T2 not shorter than the first period T1 and the averaged temperature is lower than the third temperature D3 not higher than the first temperature D1. In the case that the averaged temperature is lower than the third temperature D3 although the regeneration processing is executed the second number of times or N2 or more in the second period T2, this is judged, for example, as the clogging of the filter 11 with the particles left unburnt due to the drop of the burning temperature of the particles at the oxidation catalyst 12. When the filter 11 in the clogged state undergoes the regeneration processing of the filter 11, the burning temperature is likely to rise abnormally, and consequently, the filter 11 is liable to melt. Therefore, in this case, for example, the notification of the clogging of the filter 11 can prompt the operator to replace the filter 11.

Further, a warning according to the degradation degree of the oxidation catalyst 12 is issued. On the basis of this warning, it is possible to prompt the operator to recover the oxidation activity of the oxidation catalyst 12 and replace the filter 11, for example.

Additionally, the degradation degree of the oxidation catalyst 12 is displayed on the display 75. The operator can be thus notified of a time to recover the oxidation activity of the oxidation catalyst 12 and replace the filter 11, for example.

Further, when the working machine 20 is operated in the state that the warning is issued by the display 75, the operation of the working machine 20 is recorded. This record may be used, for example, as information to be consulted when the exhaust gas aftertreatment apparatus 10 is repaired.

Further, the information about the degradation degree undergoes the information security processing. For example, the detection of a falsification of the information and the encryption of the information can ensure the information security.

Further, the calculation of the degradation degree of the oxidation catalyst 12 may be carried out outside the working machine 20. The calculation of the degradation degree of the oxidation catalyst 12 outside the working machine 20 can reduce the load on the controller 71 mounted on the working machine 20.

The embodiment of the present invention has been described heretofore, but are merely described as examples without particularly limiting the present invention. It is the matter of design choice for changes in the details of the configuration. Furthermore, the operations and effects described in the embodiments of the present invention are merely listed as optimal operations and effects attained by the present invention, and thus should not be limited thereto.

The invention claimed is:

1. A working machine including an exhaust gas aftertreatment apparatus having a filter for collecting a particle from exhaust gas of an engine and an oxidation catalyst provided upstream of the filter for oxidizing unburnt fuel, the working machine being configured to detect degradation of the oxidation catalyst, comprising:
a temperature detecting device for detecting a temperature between the oxidation catalyst and the filter; and
a controller, wherein
the controller
executes a regeneration processing of heating the filter to burn the particle accumulated on the filter,
calculates an average of temperatures detected by the temperature detecting device in the regeneration processing,
calculates a degradation degree of the oxidation catalyst on the basis of the average,
determines whether the regeneration processing is executed a first number of times or more in a first period and the average is higher than a first temperature and lower than a second temperature, and
determines whether the regeneration processing is executed a second number of times or more that is larger than the first number of times in a second period not shorter than the first period and the average is lower than a third temperature not higher than the first temperature.

2. The working machine according to claim 1, wherein the controller calculates the average when a load on the engine is a predetermined value or smaller.

3. The working machine according claim 1, further comprising:
a warning device for issuing a warning commensurate with the degradation degree of the oxidation catalyst calculated by the controller.

4. The working machine according to claim 3, wherein the warning device includes a display device, and
the display device displays the degradation degree of the oxidation catalyst calculated by the controller.

5. The working machine according to claim 3, comprising:
a vehicle including a lower travelling body capable of travelling, an upper slewing body slewably mounted on the lower travelling body, and an attachment pivotably attached to the upper slewing body; and
a recording device for recording, when at least one of the lower travelling body, the upper slewing body, and the attachment is operated while the warning is issued by the warning device, the operation.

6. The working machine according to claim 1, wherein the controller executes an information security processing to information about the degradation degree.

7. An oxidation catalyst degradation detection device for an exhaust gas aftertreatment apparatus having a filter for collecting a particle from exhaust gas of an engine and an oxidation catalyst provided upstream of the filter for oxidizing unburnt fuel, the oxidation catalyst degradation detection device detecting degradation of the oxidation catalyst, comprising:
a temperature detecting device for detecting a temperature between the oxidation catalyst and the filter; and
a controller, wherein
the controller executes a regeneration processing of heating the filter to burn the particle accumulated on the filter, calculates an average of temperatures detected by the temperature detecting device in the regeneration processing;

calculates a degradation degree of the oxidation catalyst on the basis of the average, determines whether the regeneration processing is executed a first number of times or more in a first period and the average is higher than a first temperature and lower than a second temperature, and determines whether the regeneration processing is executed a second number of times or more that is larger than the first number of times in a second period not shorter than the first period and the average is lower than a third temperature not higher than the first temperature.

8. An oxidation catalyst degradation detection method for an exhaust gas aftertreatment apparatus having a filter for collecting a particle from exhaust gas of an engine and an oxidation catalyst provided upstream of the filter for oxidizing unburnt fuel, the oxidation catalyst degradation detection method detecting degradation of the oxidation catalyst, comprising:

a regeneration processing step of executing a regeneration processing of heating the filter to burn the particle accumulated on the filter;

a temperature detection step of detecting a temperature between the oxidation catalyst and the filter;

an average calculation step of calculating an average of temperatures detected in the temperature detection step in the regeneration processing;

a degradation degree calculation step of calculating a degradation degree of the oxidation catalyst on the basis of the average calculated in the average calculation step, a step of determining whether the regeneration processing is executed a first number of times or more in a first period and the average is higher than a first temperature and lower than a second temperature, and a step of determining whether the regeneration processing is executed a second number of times or more that is larger than the first number of times in a second period not shorter than the first period and the average is lower than a third temperature not higher than the first temperature.

9. The oxidation catalyst degradation detection method according to claim 8, wherein the calcination calculation of the degradation degree is carried out at an external device outside a vehicle.

10. A non-transitory computer readable recording medium storing an oxidation catalyst degradation detection program for an exhaust gas aftertreatment apparatus having a filter for collecting a particle from exhaust gas of an engine and an oxidation catalyst provided upstream of the filter for oxidizing unburnt fuel, the oxidation catalyst degradation detection program causing a computer to detect degradation of the oxidation catalyst by causing the computer to execute:

a regeneration processing step of executing a regeneration processing of heating the filter to burn the particle accumulated on the filter;

a temperature detection step of detecting a temperature between the oxidation catalyst and the filter;

an average calculation step of calculating an average of temperatures detected in the temperature detection step in the regeneration processing;

a degradation degree calculation step of calculating a degradation degree of the oxidation catalyst on the basis of the average calculated in the average calculation step, a step of determining whether the regeneration processing is executed a first number of times or more in a first period and the average is higher than a first temperature and lower than a second temperature, and a step of determining whether the regeneration processing is executed a second number of times or more that is larger than the first number of times in a second period not shorter than the first period and the average is lower than a third temperature not higher than the first temperature.

* * * * *